Patented Mar. 4, 1941

2,233,404

UNITED STATES PATENT OFFICE 2,233,404

DIELECTRIC COMPOSITION

Robert R. Dreisbach, Midland, Mich., assignor to The Dow Chemical Company, Midland, Mich., a corporation of Michigan No Drawing. Application June 28, 1938, Serial No. 216,298

1 Claim. (Cl. 252—66)

This invention concerns certain new liquid dielectric compositions.

The liquid dielectric compositions provided by the invention consist essentially of complex mixtures of isomeric and other closely related nuclear chlorinated ethyl benzenes, said mixtures containing an average of approximately two ethyl groups and from 3 to 4 nuclear chlorine substituents per molecule. The mixtures consist largely of isomeric trichloro- and tetrachlorodiethylbenzenes, but they may contain minor proportions of lower chlorinated diethylbenzenes as well as diluents if desired.

It is known that many liquid aromatic compounds containing a multiplicity of nuclear chlorine substituents possess high dielectric constants, high dielectric strengths and other electric properties, as well as low congealing and high boiling temperatures which render them suitable liquid electric insulating agents for most purposes. Diphenyl chlorinated to such extent as to contain an average of about 5 chlorine substituents per molecule, diphenyl oxide chlorinated to like extent, and mixtures of these compounds with trichlorobenzene are examples of well known dielectric compositions of the type just mentioned.

However, it is also known that such nuclear polychlorinated aromatic compounds are usually quite toxic, producing dermatitis on prolonged contact with the skin and sometimes causing liver and kidney disorders in workmen who are repeatedly exposed to the compounds in liquid or vapor form. Accordingly, there is some hazard involved in handling most known liquid dielectric compositions of the type just discussed.

An object of this invention is to provide certain new dielectric compositions which are relatively non-toxic as compared with most polychlorinated aromatic compounds heretofore recommended for use as dielectric agents; which are substantially non-flammable; and which possess exceptional dielectric properties and have low congealing and high boiling temperatures that permit use of the same in liquid condition at the temperatures ordinarily encountered in actual service.

The complex mixture of nuclear chlorinated diethyl benzenes comprised by the new dielectric compositions is obtained by consecutively ethylating and chlorinating benzene under conditions such as to produce nuclear substitution almost exclusively. These reactions may be carried out in any desired order, but the ethylation occurs most smoothly when carried out prior to the chlorination.

The ethylation and chlorination may be carried out in accordance with usual procedure for introducing ethyl groups or chlorine substituents into a benzene nucleus. In practice, the ethylation is preferably carried out by charging an autoclave with benzene and about 0.1 molecular equivalent of aluminum chloride and thereafter introducing ethylene at a pressure of from 30 to 100 pounds per square inch, gauge, while stirring and maintaining the mixture at a temperature between 40° and 80° C. The reaction is preferably stopped when the amount of ethylene absorbed corresponds to that theoretically required for formation of ethylated benzene containing an average of from 1.5 to 2 ethyl groups per molecule. The aluminum chloride catalyst is then removed as usual, e. g. by washing with water or an aqueous solution of mineral acid or alkali, after which unreacted benzene or toluene are distilled from the product.

The diethylated benzene produced as just described is reacted with chlorine at moderate temperatures, preferably between 20° and 60° C. and in the presence of iron, iron chloride, or other catalyst of the type which promotes chlorine substitution on the benzene nucleus. The chlorination is continued until from between 3 and 4 moles of chlorine has been reacted per mole of diethyl benzene. The mixture is then washed with aqueous alkali after which it is preferably, though not necessarily, heated to a temperature of 200°–300° C. in the presence of a small proportion, e. g. 0.01–0.05 its weight, of a basic substance such as lime, sodium hydroxide or sodium carbonate for the purpose of removing any labile chlorine substituents in the product. The product is then distilled under vacuum in order to remove any low boiling ingredients and to obtain a purified colorless liquid product of desirable appearance.

The following examples describe one of the new dielectric compositions and include electrical and biological data concerning the same. For purpose of comparison, similar data on a well known dielectric composition are also included. It will be understood that the examples are illustrative and not limiting on the invention.

Example 1

A complex liquid mixture of nuclear chlorinated diethylbenzenes was prepared by first ethylating benzene by reacting ethylene with benzene in the presence of aluminum chloride, distilling the product to separate therefrom the mixture of isomeric diethylbenzenes formed by the reaction, and thereafter reacting chlorine with the diethylbenzenes at temperatures between 40° and 60° C. in the presence of finely divided iron until the mixture had a chlorine content approximating that desired in the final product. The mixture was then washed with water to remove dissolved hydrogen chloride therefrom, after which it was treated with about 5 per cent of its weight of sodium hydroxide and heated at temperatures between 250° and 280° C. for about 30 minutes. It was next cooled, again washed with water, and distilled under vacuum. The fraction distilling at temperatures between 298.5° and 310° C. at atmospheric pressure was collected as the product. This product was a clear colorless liquid containing 52.7 per cent by weight of chlorine, i. e. an average of about 4 chlorine atoms per molecule of chlorinated diethylbenzene. It was a free-flowing liquid at −30° C., but became too viscous to flow readily when cooled to −36° C. It had a flash point of 154° C., but would not sustain a flame. Other physical properties and the electrical properties of this product are given in the following table which, for purpose of comparison, also lists the corresponding properties of a well known liquid dielectric composition consisting of a mixture of trichlorobenzene and diphenyl chlorinated sufficiently to contain about 5 chlorine atoms per molecule. In the table, this previously known dielectric composition is referred to as "known dielectric" and the product of this invention is referred to as "chlorinated diethylbenzene."

Table

| Properties | Known dielectric | Chlorinated diethylbenzene |
|---|---|---|
| *Physical* | | |
| Sp. Gr., 25°/25° C | 1.555 | 1.391. |
| Refractive index, $n_D^{20}$ | 1.6152 | 1.5737. |
| Distilling range | 213–348° C. at 1 atmos. | 298–311° C. at 1 atmos. |
| Pour point | −36 to −40° C | −36° C. |
| Flash point | 123° C | 154.5° C. |
| Saybolt viscosity at 40° C | 52 seconds | 59 seconds. |
| *Electrical* | | |
| Resistivity at 1,000 cycles | $1.9 \times 10^{12}$ ohms | $3.2 \times 10^{13}$ ohms. |
| Power factor | 0.072 | 0.009. |
| Dielectric constant | 3.91 | 3.76. |
| Breakdown potential at 0.05 inch gap | 12,000 volts | 26,000 volts. |

From the above table, it will be apparent that the known dielectric composition and the nuclear chlorinated diethylbenzene each have the physical properties required in a liquid dielectric which is to be employed for general use, although the flash point of the chlorinated diethylbenzene is considerably higher than, and preferable to, that of the known dielectric. However, it will be noted that the electric resistivity and the breakdown potential, i. e. electric potential required to cause sparking through 0.05 inch of a material, of the nuclear chlorinated diethylbenzene are far higher than the corresponding values of the known dielectric and, further, that the power factor (which indicates the power loss to be expected in using a material as an electric insulating agent) of the nuclear chlorinated diethylbenzene is considerably lower than that of the known dielectric. The dielectric properties of the chlorinated diethylbenzene are, accordingly, far superior to those of the known dielectric.

The chlorinated diethylbenzene mixture described above and "chlorinated diphenyl," which is an important ingredient of the above described "known dielectric" and is prepared by chlorinating diphenyl until the product contains an average of about 5 chlorine atoms per molecule, were tested both by contact with the skin of rabbits and also by oral administration to rabbits for the purpose of determining their relative toxicities. The chlorinated diphenyl produced severe toxic effects, regardless of the mode of application. A single application to the skin behind an ear of a rabbit produced severe blistering and edema followed by a marked epithelial hyperplasia, which required nearly six weeks to subside, and which left the skin severely pitted. When administered orally once daily for 20 days in doses corresponding to 0.1 gram of chlorinated diphenyl per kilogram body-weight of a rabbit it was found, on autopsy after completion of the feedings, that severe pathological changes had occurred in the liver and kidney of the animal. In corresponding tests carried out with the nuclear chlorinated diethylbenzene, it was found that the latter is mildly toxic. Approximately 10 to 20 daily external administrations of it were required to obtain a toxic effect as severe as that produced by a single administration of the chlorinated diphenyl. When administered once daily, in dosage of 0.1 gram of the material per kilogram body-weight of a rabbit, for 20 days, it was found on subsequent autopsy that the liver and kidney of the rabbit had undergone very slight physiological changes which were not sufficient to interfere with the normal functioning of the organs.

*Example 2*

Toxicity tests similar to those described in Example 1 were carried out for purpose of ascertaining the toxicities of nuclear chlorinated diethylbenzenes which may be present as ingredients of the dielectric compositions provided by the invention. The materials tested were diethyl dichlorobenzene, diethyl trichlorobenzene, and diethyl tetrachlorobenzene, each of said materials being the product obtained by successively ethylating and chlorinating benzene as hereinbefore described and then separating the desired material by fractional distillation. Each of these materials, when administered externally or orally to rabbits, produced mild toxic effects corresponding to those produced by the "nuclear chlorinated diethylbenzene" mixture described in Example 1. In all instances, they were far less toxic than the "chlorinated diphenyl" described in Example 1.

The new liquid dielectric compositions herein described can be employed generally in undiluted form as electric insulating agents. In most cases this will be preferable, since the addition of other substances, such as trichlorobenzene, chlorinated naphthalene, chlorinated dibenzyl, nuclear chlorinated 1.1-diphenyl ethane, etc., which in themselves possess acceptable dielectric properties, usually has the effect of impairing one or more of the physical or electric properties of the new compositions and frequently causes increased toxicity. However, in special cases it may be desirable to modify the compositions by addition of such other dielectric substance, but it is understood that the resultant diluted dielectric mixtures are also comprised within the invention.

The new liquid dielectric compositions may be used as electric insulating agents in transformers, capacitors, switch boxes, or other electrical equipment. They may also be used to impregnate paper and the like which may then be used as a solid insulating material for wrapping wires, cables, etc.

Other modes of applying the principle of the invention may be employed instead of those explained, change being made in the dielectric compositions herein disclosed, provided the ingredient or ingredients stated by any of the following claims or the equivalent of such stated ingredient or ingredients be employed.

I, therefore, particularly point out and distinctly claim as my invention:

A liquid dielectric composition consisting essentially of a mixture of diethyl tricholorobenzene and diethyl tetrachlorobenzene.

ROBERT R. DREISBACH.